United States Patent
Narula et al.

(10) Patent No.: US 11,833,902 B2
(45) Date of Patent: Dec. 5, 2023

(54) WASTE HEAT RECOVERY HYBRID POWER DRIVE

(71) Applicant: CUMMINS INC., Columbus, IN (US)

(72) Inventors: Manik Narula, Columbus, IN (US); Timothy C. Ernst, Columbus, IN (US); Michael J. Ruth, Franklin, IN (US); Jonathan A. Dickson, Columbus, IN (US); J. Steven Kolhouse, Columbus, IN (US); Nimish Bagayatkar, Carmel, IN (US)

(73) Assignee: Cummins Inc., Columbus, IN (US)

( * ) Notice: Subject to any disclaimer, the term of this patent is extended or adjusted under 35 U.S.C. 154(b) by 496 days.

(21) Appl. No.: 16/976,213

(22) PCT Filed: Feb. 27, 2019

(86) PCT No.: PCT/US2019/019761
§ 371 (c)(1),
(2) Date: Aug. 27, 2020

(87) PCT Pub. No.: WO2019/168927
PCT Pub. Date: Sep. 6, 2019

(65) Prior Publication Data
US 2021/0001703 A1 Jan. 7, 2021

Related U.S. Application Data

(60) Provisional application No. 62/637,107, filed on Mar. 1, 2018.

(51) Int. Cl.
*B60K 6/32* (2007.10)
*B60K 6/46* (2007.10)
*F02G 5/00* (2006.01)

(52) U.S. Cl.
CPC ............. *B60K 6/32* (2013.01); *B60K 6/46* (2013.01); *F02G 5/00* (2013.01)

(58) Field of Classification Search
CPC .... B60K 6/26; B60K 6/28; B60K 6/32; F02G 5/02; F02G 5/04
See application file for complete search history.

(56) References Cited

U.S. PATENT DOCUMENTS

| 5,291,960 A | 3/1994 | Brandenburg et al. |
| 5,910,722 A | 6/1999 | Lyons et al. |

(Continued)

FOREIGN PATENT DOCUMENTS

WO   WO-2017/100613   6/2017

OTHER PUBLICATIONS

International Search Report and Written Opinion for PCT Application No. PCT/US2019/019761, dated May 8, 2019.

*Primary Examiner* — Jeffrey J Restifo
(74) *Attorney, Agent, or Firm* — Foley & Lardner LLP

(57) ABSTRACT

A vehicle system includes an engine, a transmission, a differential, and a waste heat recovery (WHR) drive that converts thermal energy into mechanical and electrical energy. The WHR drive can include a WHR power unit structured to convert thermal energy into rotation of a WHR drive shaft. A motor/generator having a motor/generator shaft can selectively operate as a motor or a generator. A mechanical linkage is structured to selectively link an output shaft to one of the WHR drive shaft and the motor/generator drive shaft independently of the other of the WHR drive shaft and the motor/generator drive shaft. The output shaft is selectively coupled to one of the engine, the transmission, or the differential. The vehicle system may also include a (Continued)

traction motor to provide drive to the vehicle. The output shaft can be selectively coupled to the traction motor or the engine.

24 Claims, 9 Drawing Sheets

(56) References Cited

U.S. PATENT DOCUMENTS

| | | | |
|---|---|---|---|
| 6,450,283 B1 | 9/2002 | Taggett | |
| 6,559,551 B2 | 5/2003 | Graage et al. | |
| 8,397,504 B2 | 3/2013 | Guzman et al. | |
| 8,628,025 B2 | 1/2014 | Bucknell | |
| 8,739,531 B2 | 6/2014 | Teng et al. | |
| 9,562,462 B2 | 2/2017 | Etchason | |
| 11,022,014 B1* | 6/2021 | Parrish | F01N 5/02 |
| 11,035,260 B1* | 6/2021 | Kravets | F01K 23/10 |
| 2003/0115877 A1 | 6/2003 | Bara et al. | |
| 2003/0188728 A1 | 10/2003 | Shinohara et al. | |
| 2006/0047398 A1 | 3/2006 | Abe et al. | |
| 2009/0071156 A1* | 3/2009 | Nishikawa | F02G 5/02 |
| | | | 60/660 |
| 2012/0192560 A1* | 8/2012 | Ernst | F02M 26/25 |
| | | | 123/563 |
| 2012/0198839 A1* | 8/2012 | Nelson | F02M 26/37 |
| | | | 60/605.1 |
| 2012/0210713 A1* | 8/2012 | Ernst | F01N 5/02 |
| | | | 60/668 |
| 2012/0215429 A1* | 8/2012 | Yumisashi | B60W 10/08 |
| | | | 701/112 |
| 2012/0216762 A1* | 8/2012 | Ernst | F01K 27/02 |
| | | | 123/41.21 |
| 2012/0232731 A1* | 9/2012 | Sujan | B60W 50/0097 |
| | | | 701/22 |
| 2013/0219872 A1* | 8/2013 | Gibble | F01K 23/065 |
| | | | 60/320 |
| 2013/0296127 A1 | 11/2013 | Shelton et al. | |
| 2014/0137554 A1* | 5/2014 | Ernst | F02G 5/04 |
| | | | 60/618 |
| 2014/0144136 A1* | 5/2014 | Versteyhe | F02B 37/10 |
| | | | 60/605.1 |
| 2014/0165562 A1* | 6/2014 | Nagai | F01K 23/10 |
| | | | 60/618 |
| 2014/0345274 A1 | 11/2014 | Ernst et al. | |
| 2015/0027118 A1* | 1/2015 | Tricaud | F02G 5/04 |
| | | | 60/624 |
| 2015/0159535 A1* | 6/2015 | Zigan | F01N 5/02 |
| | | | 60/615 |
| 2015/0219043 A1* | 8/2015 | Schulz | F02G 5/02 |
| | | | 123/2 |
| 2016/0322814 A1* | 11/2016 | Melnyk | F01K 5/00 |
| 2017/0072813 A1 | 3/2017 | Martin et al. | |
| 2017/0260889 A1* | 9/2017 | Zhou | F02B 39/12 |
| 2017/0292447 A1* | 10/2017 | Himmelmann | F01K 23/10 |
| 2017/0306804 A1* | 10/2017 | Nakamura | F02G 5/02 |
| 2018/0051652 A1* | 2/2018 | Filippone | F02G 5/02 |
| 2018/0119578 A1* | 5/2018 | Zhou | F01N 5/02 |
| 2018/0215246 A1* | 8/2018 | Franke | F02G 5/00 |
| 2018/0313233 A1* | 11/2018 | Tateno | F01K 15/02 |
| 2018/0328233 A1* | 11/2018 | Choi | F01K 23/065 |
| 2019/0178110 A1* | 6/2019 | Bagayatkar | F02G 5/00 |
| 2019/0270442 A1* | 9/2019 | Narula | B60W 30/18127 |
| 2021/0001703 A1* | 1/2021 | Narula | B60K 6/32 |
| 2021/0140391 A1* | 5/2021 | Huscher | F02B 39/085 |
| 2021/0188074 A1* | 6/2021 | Correa | B60K 6/547 |
| 2021/0215082 A1* | 7/2021 | Kardos | F02G 5/02 |
| 2021/0301781 A1* | 9/2021 | Abaitancei | F15B 1/024 |
| 2023/0073678 A1* | 3/2023 | Schydlo | B60T 1/087 |

* cited by examiner

WASTE HEAT RECOVERY HYBRID POWER DRIVE

CROSS-REFERENCE TO RELATED PATENT APPLICATIONS

This patent application is the U.S. national phase of PCT Application No. PCT/US2019/019761, filed Feb. 27, 2019, which claims priority to U.S. Provisional Application No. 62/637,107, filed Mar. 1, 2018, entitled "Waste Heat Recovery Hybrid Power Drive," which are incorporated herein by reference in their entirety.

STATEMENT OF FEDERALLY SPONSORED RESEARCH OR DEVELOPMENT

This invention was made with Government support under DE-EE0007761 awarded by the United States Department of Energy. The Government has certain rights in this invention.

TECHNICAL FIELD

The present disclosure relates to waste heat recovery (WHR) systems, and in particular to WHR systems used with hybrid vehicles.

BACKGROUND

A WHR system recovers heat energy from a vehicle, such as from an internal combustion engine of the vehicle that would otherwise be lost. The more waste heat energy extracted from vehicle by a WHR system, the greater the potential efficiency of the engine. In other words, rather than the extracted heat being lost, the extracted heat energy may be repurposed to, e.g., supplement the power output from the internal combustion engine thereby increasing the efficiency of the system.

SUMMARY

In one aspect, a vehicle system includes an engine, a transmission coupled to the engine, a differential coupled to the transmission, and a WHR hybrid power drive system including a WHR power unit, a motor/generator, and a mechanical linkage. The WHR power unit is structured to convert thermal energy into rotation of a WHR drive shaft. The motor/generator is structured to selectively operate as a motor or a generator, the motor/generator having a motor/generator drive shaft. The mechanical linkage is coupled to the WHR drive shaft, the motor generator drive shaft, and an output shaft, and is structured to selectively link the output shaft to one of the WHR drive shaft and the motor/generator drive shaft independently of the other of the WHR drive shaft and the motor/generator drive shaft. The output shaft is coupled to at least one of a shaft of the engine, a shaft of the transmission, or a shaft of the differential.

In one or more implementations, the output shaft is coupled to the shaft of the engine, wherein the WHR drive is mounted on the engine, and wherein the WHR power unit is structured to convert thermal energy generated by the engine into the rotation of the WHR drive shaft. The output shaft may be coupled to the shaft of the transmission, wherein the WHR drive is mounted on the transmission, and wherein the WHR power unit is structured to convert thermal energy generated by the transmission into the rotation of the WHR drive shaft. The output shaft may be coupled to the shaft of the differential, wherein the WHR drive is mounted on a chassis of the vehicle, and wherein the WHR power unit is structured to convert thermal energy generated by the transmission into the rotation of the WHR drive shaft.

In yet another aspect, a vehicle system includes an engine, a generator coupled to the engine, the generator structured to generate and provide electrical energy to a battery system, a traction motor coupled to a final drive of the vehicle, and a WHR hybrid power drive system including a WHR power unit, a motor/generator, and a mechanical linkage. The WHR power unit is structured to convert thermal energy into rotation of a WHR drive shaft. The motor/generator is structured to selectively operate as a motor or a generator, the motor/generator having a motor/generator drive shaft. The mechanical linkage is coupled to the WHR drive shaft, the motor generator drive shaft, and an output shaft, and is structured to selectively link the output shaft to one of the WHR drive shaft and the motor/generator drive shaft independently of the other of the WHR drive shaft and the motor/generator drive shaft. The output shaft is coupled to one of a shaft of the engine or a shaft of the traction motor. In one or more implementations, the WHR drive provides electrical energy to the battery system.

In one aspect, a vehicle system comprises a power generator and a waste heat recovery (WHR) hybrid power drive system. The WHR hybrid power drive system comprises a WHR power unit structured to convert thermal energy generated by the vehicle system into rotation of a WHR drive shaft. The WHR hybrid power drive system further comprises a motor/generator structured to selectively operate as a motor or a generator, the motor/generator having a motor/generator drive shaft. The WHR hybrid power drive system also includes a mechanical linkage coupled with the WHR drive shaft, the motor/generator and an output shaft, structured to selectively link the output shaft to one of the WHR drive shaft and the motor/generator drive shaft independently of the other of the WHR drive shaft and the motor/generator drive shaft, where the output shaft is directly or indirectly coupled to a shaft of the power generator or to a drive shaft of a drive train of the vehicle system.

In one or more implementations, the WHR hybrid power drive system further comprises a first decoupling device positioned between the WHR drive shaft and the mechanical linkage, the first decoupling device allowing the WHR drive shaft to rotate at a speed that is different from a speed of rotation of at least one of the output shaft or the motor/generator drive shaft. In one or more implementations, the WHR hybrid power drive system further comprises a second decoupling device positioned between the output shaft and the mechanical linkage, the second decoupling device allowing the output shaft to rotate at a speed that is different from a speed of rotation of at least one of the WHR drive shaft or the motor/generator drive shaft. In one or more implementations, the WHR hybrid power drive system further comprises a third decoupling device positioned between the motor/generator drive shaft and the mechanical linkage, the third decoupling device allowing the motor/generator drive shaft to rotate at a speed that is different from a speed of rotation of at least one of the output shaft or the WHR drive shaft. In one or more implementations, the WHR hybrid power drive system further comprises a feed pump coupled to the WHR drive shaft, the feed pump configured to pump a working fluid in a working fluid circuit of the WHR hybrid power drive.

In one or more implementations, the mechanical linkage is structured to simultaneously and proportionally transfer power from the WHR drive shaft to the output shaft and the motor/generator drive shaft. In one or more implementations, the mechanical linkage is structured to simultaneously and proportionally transfer power from the output shaft to the WHR drive shaft and the motor/generator drive shaft. In one or more implementations, the mechanical linkage is controlled to transfer power from the WHR drive shaft to the motor/generator drive shaft in response to the vehicle system not being in motion.

In one or more implementations, the power generator comprises an engine, the output shaft is coupled to a shaft of the engine, the WHR power unit is mounted on the engine, and the WHR power unit is structured to convert thermal energy generated by the engine into the rotation of the WHR drive shaft. In one or more implementations, the drive train comprises a transmission, the output shaft is coupled to a shaft of the transmission, the WHR power unit is mounted on the transmission, and the WHR power unit is structured to convert thermal energy generated by the transmission into the rotation of the WHR drive shaft. In one or more implementations, the drive train comprises a differential, the output shaft is coupled to a shaft of the differential, the WHR power unit is mounted on the differential, and the WHR power unit is structured to convert thermal energy generated by the differential into the rotation of the WHR drive shaft.

In one or more implementations, the power generator comprises an engine and a generator structured to generate and provide electrical energy to a battery system, and the vehicle system further comprises a traction motor mechanically coupled to a final drive of the vehicle system and electrically coupled to the battery system, where the output shaft is coupled to a shaft of the engine or a shaft of the generator. In one or more implementations, the power generator comprises an engine and a generator structured to generate and provide electrical energy to a battery system, the vehicle system further comprises a traction motor mechanically coupled to a final drive of the vehicle system and electrically coupled to the battery system, where the output shaft is coupled to a shaft of the traction motor.

In one or more implementations, the power generator comprises a fuel cell structured to generate and provide electrical energy to a battery system, the vehicle system further comprising a traction motor mechanically coupled to a final drive of the vehicle system and electrically coupled to the battery system, where the output shaft is coupled to a shaft of at least one of a fuel pump, a cooling fan, a cooling pump, or a compressor of the fuel cell. In one or more implementations, the power generator comprises a fuel cell structured to generate and provide electrical energy to a battery system, the vehicle system further comprises a traction motor mechanically coupled to a final drive of the vehicle system and electrically coupled to the battery system, where the output shaft is coupled to a shaft of the traction motor.

In yet another aspect, a method for operating a vehicle system comprising a power generator and a drive train, the method comprises providing a waste heat recovery (WHR) hybrid power drive system comprising a WHR power unit structured to convert thermal energy generated by the vehicle system into rotation of a WHR drive shaft, a motor/generator structured to selectively operate as a motor or a generator, the motor/generator having a motor/generator drive shaft, and a mechanical linkage coupled with the WHR drive shaft, the motor/generator and an output shaft. The method further comprises controlling the mechanical linkage to link and transfer power between the output shaft and the WHR drive shaft. The method also comprises controlling the mechanical linkage to delink the output shaft from the WHR drive shaft. The method additionally comprises controlling the mechanical linkage to link and transfer power between the output shaft and the motor/generator drive shaft, where the output shaft is directly or indirectly coupled to a shaft of the power generator or to a drive shaft of a drive train of the vehicle system.

In one or more implementations, the method further comprises, while the output shaft is linked with the WHR drive shaft, controlling a first decoupling device positioned between the WHR drive shaft and the mechanical linkage or a second decoupling device positioned between the output shaft and the mechanical linkage to rotate the WHR drive shaft at a speed that is different from a speed of rotation of the output shaft. In one or more implementations, the method further comprises, while the output shaft is linked with the motor/generator drive shaft, controlling a second decoupling device positioned between output shaft and the mechanical linkage or a third decoupling device positioned between the motor/generator drive shaft and the mechanical linkage to rotate the motor/generator drive shaft at a speed that is different from a speed of rotation of the output shaft.

In one or more implementations, the method further comprises transferring power from the WHR drive shaft to a feed pump coupled to the WHR drive shaft, the feed pump configured to pump a working fluid in a working fluid circuit of the WHR hybrid power drive system. In one or more implementations, the method further comprises controlling the mechanical linkage to delink the output shaft from the motor/generator drive shaft, and controlling the mechanical linkage to link and transfer power between the WHR drive shaft and the motor/generator drive shaft.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive internal combustion assemblies and methods of operating internal combustion assemblies. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

WHR systems can recover thermal or other forms of energy in a vehicle that would otherwise be dissipated and lost to the environment, and help convert the energy into usable electrical or mechanical energy. In particular, WHR systems can absorb heat generated by various components of a vehicle, such as, for example, the engine or the exhaust. The WHR system can use the absorbed heat to impart motion to a heated working fluid, which, in turn, can drive or rotate a driving shaft. The driving shaft can be coupled to a final drive (such as, for example, wheels) or to a drive shaft of a motor/generator that can convert the imparted torque into electrical energy. In hybrid vehicles, the WHR system can provide the electrical energy for charging a battery, which, in turn, can provide power to one or more electrical motors that drive the vehicle.

In some vehicles, the WHR system and the motor/generator are connected in series. That is, the WHR system drives the same shaft as the motor/generator, and the power generated by the WHR system is passed through the motor/generator before being provided to the drive shaft. This series connection can restrict the speed of the WHR system to the same speed as the motor/generator. In one approach, the WHR system can include a mechanical linkage that can disengage the WHR system and the motor/generator. In such an approach, any one of the WHR system and the motor/generator can drive the engine of the vehicle independently of the other.

The WHR system can be installed in vehicles that are predominantly driven by an internal combustion engine. The WHR system can be coupled to or mounted on any one of the engine, a transmission, and a differential of the vehicle to exchange mechanical power. The electrical energy generated by the WHR system can be provided to a battery system. The WHR system also can be installed in vehicles that are predominantly driven by an electric motor. The WHR system can be coupled to an engine that is coupled to a generator, or coupled to the electric motor that drives the vehicle. The WHR system and the various example vehicle systems are discussed below.

Figure 1:
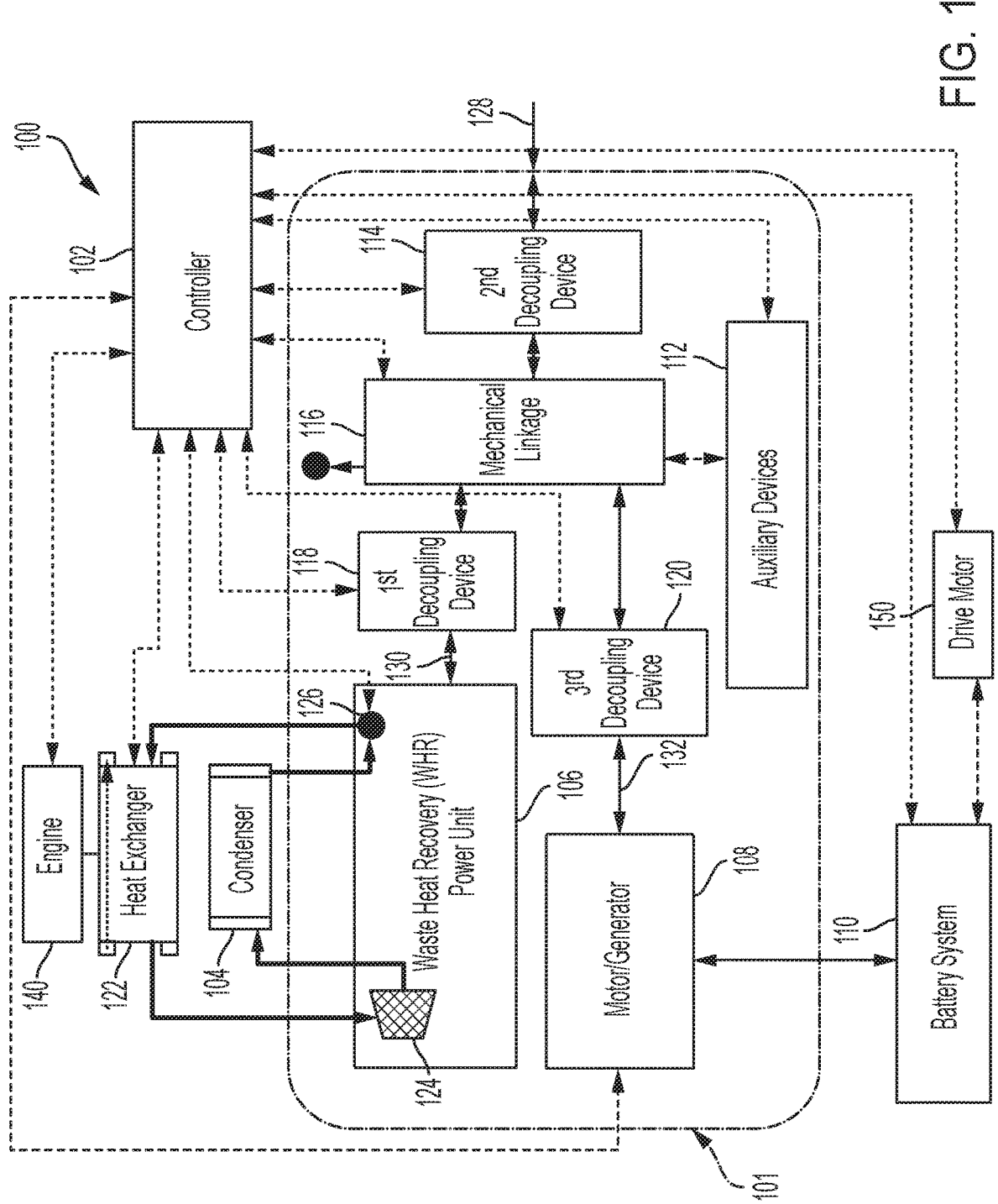
FIG. 1 shows an example WHR hybrid power drive system, according to an embodiment of the present disclosure.

FIG. 1 shows an example WHR hybrid power drive system 100. The WHR hybrid power drive system 100 includes a WHR-motor/generator hybrid power drive ("WHR-MG drive") 101, a controller 102, a heat exchanger 122, a condenser 104, a battery system 110, and a drive motor 150. The WHR hybrid power drive system 100 can be utilized in a vehicle, such as a hybrid vehicle. In such a hybrid vehicle, power to the drive shaft of the vehicle can be provided by an engine 140, or an electrical motor, such as the drive motor 150. The WHR-MG drive 101 can recover thermal energy and convert the recovered thermal energy into electrical or mechanical energy. The electrical or mechanical energy can be provided to drive the vehicle.

The WHR-MG drive 101 can include a WHR power unit 106, which includes an expander 124 and a feed pump 126. The WHR-MG drive 101 also includes a motor/generator 108, and a mechanical linkage 116. The WHR-MG drive 101 may optionally include a first decoupling device 118, a second decoupling device 114, a third decoupling device 120, and auxiliary devices 112. The expander 124 and the feed pump 126 are in fluid communication with the heat exchanger 122 and the condenser 104. In particular, the expander 124, the condenser 104, the feed pump 126, and the heat exchanger 122 form a Rankine cycle waste heat recovery system or an organic Rankine cycle if the working fluid is an organic high molecular mass fluid with a liquid-vapor phase change that is lower than the water-steam phase change. Examples of Rankine cycle working fluids, organic and inorganic, include Genetron® R-245fa or Solstice™ R1233zd(E) from Honeywell, Therminol®, Dowtherm J™ from Dow Chemical Co., Fluorinol® from American Nickeloid, toluene, dodecane, isododecane, methylundecane, neopentane, neopentane, octane, water/methanol mixtures, or steam.

The expander 124 is positioned downstream of the heat exchanger 122, and receives a working fluid that has absorbed heat energy in the heat exchanger 122. The heat exchanger 122 provides heat transfer from one or more heat sources in the vehicle to the working fluid. The heat sources can include, for example, exhaust gas produced by the engine 140, heat generated at the brake-pads/rotors, and heat produced by the drive motor 150 or the engine 140. The expander 124 can include a turbine, a piston, a screw, and the like, and can convert the motion of the working fluid into rotational motion of a WHR-MG drive shaft 130. The condenser 104 is coupled downstream of the expander 124, and provides cooling to the working fluid provided by the expander 124. The output of the condenser 104 is coupled to the feed pump 126, which, when activated, circulates the working fluid within the working fluid circuit. The feed pump 126 can be provided power from several sources. For example, the feed pump 126 can be coupled to the WHR-MG drive shaft 130, which is driven by the expander 124. In another example, the feed pump 126 can be coupled to an output shaft 128 via the mechanical linkage 116 when the vehicle is running. In another example, the feed pump 126 can be driven by the motor/generator 108 also via the mechanical linkage 116. Alternatively, the feed pump 126 could be coupled to a battery that provides power to operate the feed pump 126.

The motor/generator 108 can operate as a motor or a generator. When operating as a motor, the motor/generator 108 converts electrical energy received from the battery system 110 into rotational motion of a motor/generator drive shaft 132. When operating as a generator, the motor/generator 108 converts rotational motion of the motor/generator drive shaft 132 into electrical energy, which is provided to the battery system 110. The battery system 110 can provide power to a drive motor 150, which can be coupled to the output shaft 128, or another drive shaft, such as the final drive shaft, to provide motion to the vehicle.

The WHR-MG drive 101 is coupled to the mechanical linkage 116 via the WHR-MG drive shaft 130. The rotational energy imparted onto the WHR-MG drive shaft 130 by the expander 124 can drive the mechanical linkage 116, which can include a clutch, or a similar device, that can selectively engage and disengage the WHR-MG drive shaft 130 from the output shaft 128 of the vehicle. Similarly, the mechanical linkage 116 can selectively engage and disengage the output shaft 128 from the motor/generator drive shaft 132, which is coupled to the motor/generator. The mechanical linkage 116 can independently couple any one of the WHR-MG drive shaft 130 and the motor/generator drive shaft 132 to the output shaft 128. This allows power transfer between the WHR power unit 106 and the output shaft 128 independently of the motor/generator 108, and similarly allows power transfer between the motor/generator 108 and the output shaft 128 independently of the WHR power unit 106. The mechanical linkage 116 can also couple the WHR-MG drive shaft 130 to the motor/generator drive shaft 132, and decouple both these drive shafts from the output shaft 128. This allows power transfer between the WHR power unit 106 and the motor/generator 108 independently of the output shaft 128. For example, when the expander 124 is not producing shaft power, such as during vehicle startup or shutdown, the feed pump 126 can be driven by the motor/generator drive shaft 132. This can also allow pre-charging of the heat exchanger 122 with the working fluid.

As mentioned above, the WHR-MG drive 101 can optionally include the first decoupling device 118, the second decoupling device 114, and a third decoupling device 120. The first decoupling device 118 is positioned between the WHR power unit 106 and the mechanical linkage 116, the second decoupling device 114 is positioned between the mechanical linkage 116 and the output shaft 128, and the third decoupling device 120 is positioned between the motor/generator 108 and the mechanical linkage 116. The first, second, and third decoupling devices 118, 114, and 120 can be variable speed decoupling devices such as a planetary gear arrangement with a clutch, or a variable speed traction drive with traction fluid, or belt drive arrangement with movable sheaves which can create a variable turning ratio. The decoupling devices can allow variable speed rotation of the shafts coupled thereto. For example, the first decoupling device 118 can be configured to allow the WHR-MG drive shaft 130 to rotate at a speed that is different from a shaft coupling the first decoupling device to the mechanical linkage 116. Similarly, the second decoupling device 114 can be configured to allow the output shaft to rotate at a speed that is different from that of the shaft coupling the second decoupling device 114 to the mechanical linkage 116. Likewise, the third decoupling device 120 can be configured to allow the motor/generator drive shaft 132 to rotate at a speed that is different from that of a shaft coupling the third decoupling device 120 to the mechanical linkage 116. Including the first, second, and the third decoupling devices 118, 114, and 120 can allow the WHR-MG drive shaft 130, the output shaft 128, and the motor/generator drive shaft 132 to rotate at different speeds. This can be beneficial in operating both the WHR power unit 106 and the motor/generator 108 at their respective and different optimal speeds.

For each particular mass flowrate through the WHR expander 124 or for a particular inlet and outlet pressure, the optimal speed or rotation (of the WHR drive shaft 130) for maximum efficiency or power for the WHR expander 124 may be different from the speed of rotation of the output shaft 128. Similarly, for a particular power or torque transfer for the motor/generator 108, the optimal speed of rotation of the motor/generator drive shaft 132 for maximum efficiency of the motor/generator 108 may be different from the speed of rotation of the output shaft 128. With independent control of rotational speed for both the WHR expander 124 and the motor/generator 108, the optimum system performance can be achieved.

The WHR-MG drive 101 can optionally also include auxiliary devices 112 such as pumps and motors. The auxiliary devices 112 can be coupled to the mechanical linkage 116, and can include pumps or motors that can provide lubrication and cooling to the WHR-MG drive 101. For example, the one or more auxiliary devices 112 can be coupled to the mechanical linkage 116 to receive power to pump or circulate lubricant and coolant to various components of the WHR-MG drive 101 such as the WHR power unit 106, the motor/generator 108, the mechanical linkage 116, the optional first, second, and third decoupling devices 118, 114, and 120.

The controller 102 controls the operation of the WHR hybrid power drive system 100. The controller 102 can include a processor, a microcontroller, an application specific integrated circuit, a field programmable program logic (FPGA), or any other circuit. While not shown, the controller can include or be coupled to a volatile memory, a non-volatile memory, data storage, input-output interface circuits, and user interface circuits. The controller 102 can be coupled to one or more sensors in the WHR hybrid power drive system 100 and one or more actuators and switches that can control the operation or change the configuration of one or more components of the system 100.

The controller 102 controls the operation of the WHR-MG drive 101 during startup of the vehicle. For example, the WHR power unit 106 may not produce any power before the vehicle is running and generating heat. In such instances, the WHR power unit 106 may not be able to sustain the working fluid circuit. The controller 102 can provide external mechanical or electrical power to the WHR power unit 106 to operate the feed pump 126. For example, the controller 102 controls the motor/generator 108 to operate as a motor by drawing power from the battery system 110 and rotating the motor/generator drive shaft 132. The controller 102 also controls the mechanical linkage 116 to mechanically link the motor/generator drive shaft 132 to the WHR-MG drive shaft 130, which is coupled to the feed pump 126. Thus, the mechanical energy generated by the motor/generator 108 is transferred to the feed pump 126, which causes the working fluid to circulate in the working fluid circuit. Alternatively, if the vehicle is in motion, the controller 102 can control the mechanical linkage 116 to instead couple the output shaft 128 to the WHR-MG drive shaft 130, thereby transferring the mechanical power from the rotating output shaft 128 to the feed pump 126. In yet another approach, the controller 102 can initiate providing electric power to the feed pump 126 via a battery circuit (such as the battery system 110) to start the feed pump 126. The controller 102 can maintain providing power to the WHR-MG drive shaft 130 until the WHR power unit 106 is self-sustaining. That is, the WHR power unit 106 is able to convert thermal energy into mechanical energy (by the expander 124), that is sufficient to operate the feed pump 126. Once the WHR power unit 106 operates in a self-sustaining mode, the controller 102 disengages any electrical power provided to the feed pump 126 and engages the WHR-MG drive shaft 130 to the output shaft 128 or to the motor/generator drive shaft 132, to transfer power generated by the WHR power unit 106.

When the WHR power unit 106 is generating power, the controller 102 can configure the mechanical linkage 116 such that the power generated by the WHR power unit 106 could be provided to either the output shaft 128 or to the motor/generator 108. To provide power to the output shaft 128, the controller 102 controls the mechanical linkage 116 to couple the WHR-MG drive shaft 130 to the output shaft 128. The output shaft 128 can, in turn, be coupled to a transmission, or a final drive shaft. To provide power to the motor/generator 108 instead, the controller 102 controls the mechanical linkage 116 to couple the WHR-MG drive shaft 130 to the motor/generator drive shaft 132, and controls the motor/generator 108 to operate as a generator. Thus, the motor/generator 108 converts the mechanical power generated by the WHR power unit 106 into electrical energy, which is provided to the battery system 110.

The controller 102 can also initiate transfer of power from the output shaft 128 to the motor/generator 108. For example, the controller 102 controls the mechanical linkage 116 to couple the output shaft 128 to the motor/generator drive shaft 132 when the vehicle is in motion. The controller 102 controls the motor/generator 108 to operate as a generator, such that the motor/generator 108 converts mechanical power received from the output shaft 128 into electrical energy, which is provided to the battery system 110. In some instances, the controller 102 can initiate the transfer of power from the output shaft 128 to the motor/generator 108 during braking. That is, when the controller 102 detects the application of the brake, the controller 102 controls the mechanical linkage 116 to couple the output shaft 128 to the motor/generator drive shaft 132. Thus, power that may have otherwise been lost during braking is converted into electrical energy to charge the battery system 110.

In instances where the WHR-MG drive 101 includes the first, second, and the third decoupling devices 118, 114, and 120, the controller 102 can control these decoupling devices such that the motor/generator 108 and the WHR power unit 106 can operate at optimal speeds. For example, when transferring power between the WHR power unit 106 and the output shaft 128, the controller 102 controls one or both of the first decoupling device 118 and the second decoupling device 114 such that the speeds of rotations of the WHR-MG drive shaft 130 is different from the speed of rotation of the output shaft 128. In particular, the controller 102 ensures that the speed of the WHR-MG drive shaft 130 is maintained at the optimal speed. In another example, when transferring power between the motor/generator 108 and the output shaft 128, the controller 102 controls one or both of the second decoupling device 114 and the third decoupling device 120 such that the speeds of rotation of the WHR-MG drive shaft 130 and the output shaft 128 are different. In particular, the controller 102 ensures that the speed of the motor/generator drive shaft 132 is maintained at the optimal speed.

The controller 102 also can transfer power between the WHR power unit 106 and the motor/generator 108. For example, when the vehicle is not in motion, but the WHR power unit 106 is still generating power, the controller 102 can control the first decoupling device 118, the mechanical linkage 116 and the third decoupling device 120 to transfer power between the WHR-MG drive shaft 130 and the motor/generator drive shaft 132. The controller 102 can configure the first decoupling device 118 and the third decoupling device 120 such that the optimal speeds of the WHR-MG drive shaft 130 and the motor/generator drive shaft 132 can be maintained.

The controller 102 also can facilitate simultaneous transfer of power from one of the WHR drive shaft 130, the motor/generator drive shaft 132, and the output shaft 128 to the other two of the WHR drive shaft 130, the motor/generator drive shaft 132, and the output shaft 128. In particular, the controller 102 can control the mechanical linkage 116 such that the power is transferred simultaneously and proportionally. For example, when the WHR drive shaft 130 is providing power, the controller 102 can control the mechanical linkage 116 to transfer a portion of the power from the WHR drive shaft 130 to the output shaft 128 and another portion to the motor/generator drive shaft 132. In this manner, the WHR drive shaft 130 can simultaneously provide power to the engine and charge the battery system 110. In a similar manner, the controller 102 can control the mechanical linkage 116 to transfer power from the motor/generator shaft 132 simultaneously and proportionally to both the WHR drive shaft 130 and to the output shaft 128. In addition, the controller 102 can control the mechanical linkage 116 to transfer power from the output shaft 128 simultaneously and proportionally to both the WHR drive shaft 130 and to the motor/generator drive shaft 132.

Figure 2:
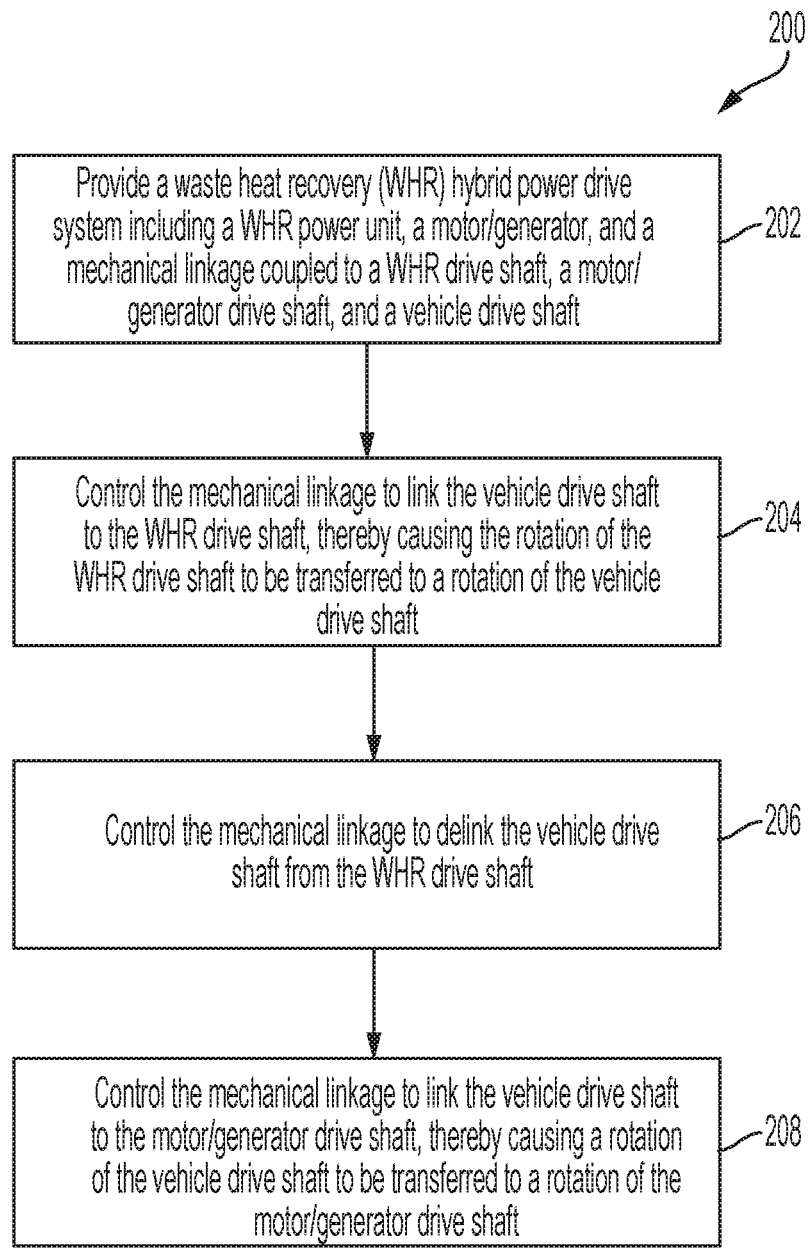
FIG. 2 shows a flow diagram of an example process for controlling a WHR hybrid power system, according to an embodiment of the present disclosure.

FIG. 2 shows a flow diagram of an example process 200 for controlling a WHR hybrid power system. The process 200 includes providing a waste heat recovery (WHR) hybrid power drive system comprising: a WHR power unit, a motor/generator, and a mechanical linkage coupled to a WHR drive shaft, a motor/generator drive shaft, and a output shaft (202). At least one example of this operation has been discussed above in relation to FIG. 1. In particular, FIG. 1 shows a WHR-MG drive 101 that includes a WHR power unit 106, a motor/generator 108, and a mechanical linkage 116. The WHR power unit 106 is structured to convert thermal energy, obtained from the heat exchanger 122, into mechanical energy that manifests as rotation of the WHR-MG drive shaft 130. The motor/generator 108 is structured to operate as a motor or a generator and includes a motor/generator drive shaft 132. The mechanical linkage 116 can link or delink the output shaft 128 from the WHR-MG drive shaft 130 or the motor/generator drive shaft 132.

The process 200 further includes controlling the mechanical linkage to link the output shaft to the WHR drive shaft, thereby causing the rotation of the WHR drive shaft to be transferred to a rotation of the output shaft (204). At least one example of this operation has been discussed above in relation to FIG. 1. For example, when the WHR power unit 106 is generating mechanical power, the controller 102 can control the mechanical linkage 116 to couple the WHR-MG drive shaft 130 to the output shaft 128. The controller 102 can control the mechanical linkage 116 when power is to be transferred from the WHR power unit 106 to the output shaft 128.

The process 200 also includes controlling the mechanical linkage to delink the output shaft from the WHR drive shaft (206). At least one example of this operation has been discussed above in relation to FIG. 1. For example, the controller 102 can determine that the power from the output shaft 128 is to be transferred to the battery system 110. Therefore, the controller 102 can control the mechanical linkage 116 to delink the output shaft 128 from the WHR-MG drive shaft 130.

The process 200 further includes controlling the mechanical linkage to link the output shaft to the motor/generator drive shaft, thereby causing a rotation of the output shaft to be transferred to a rotation of the motor/generator drive shaft (208). At least one example of this operation has been discussed above in relation to FIG. 1. For example, the controller 102, after controlling the mechanical linkage 116 to delink the output shaft 128 from the WHR-MG drive shaft 130, can control the mechanical linkage 116 to link the output shaft 128 to the motor/generator drive shaft 132. Therefore, the rotation of the output shaft 128 will be transferred to the rotation of the motor/generator drive shaft 132. The controller 102 also can control the motor/generator 108 to operate as a generator, thereby causing the mechanical energy provided to the motor/generator 108 by the rotation of the motor/generator drive shaft 132 into electrical energy, which can be provided to the battery system 110. For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

Figure 3:
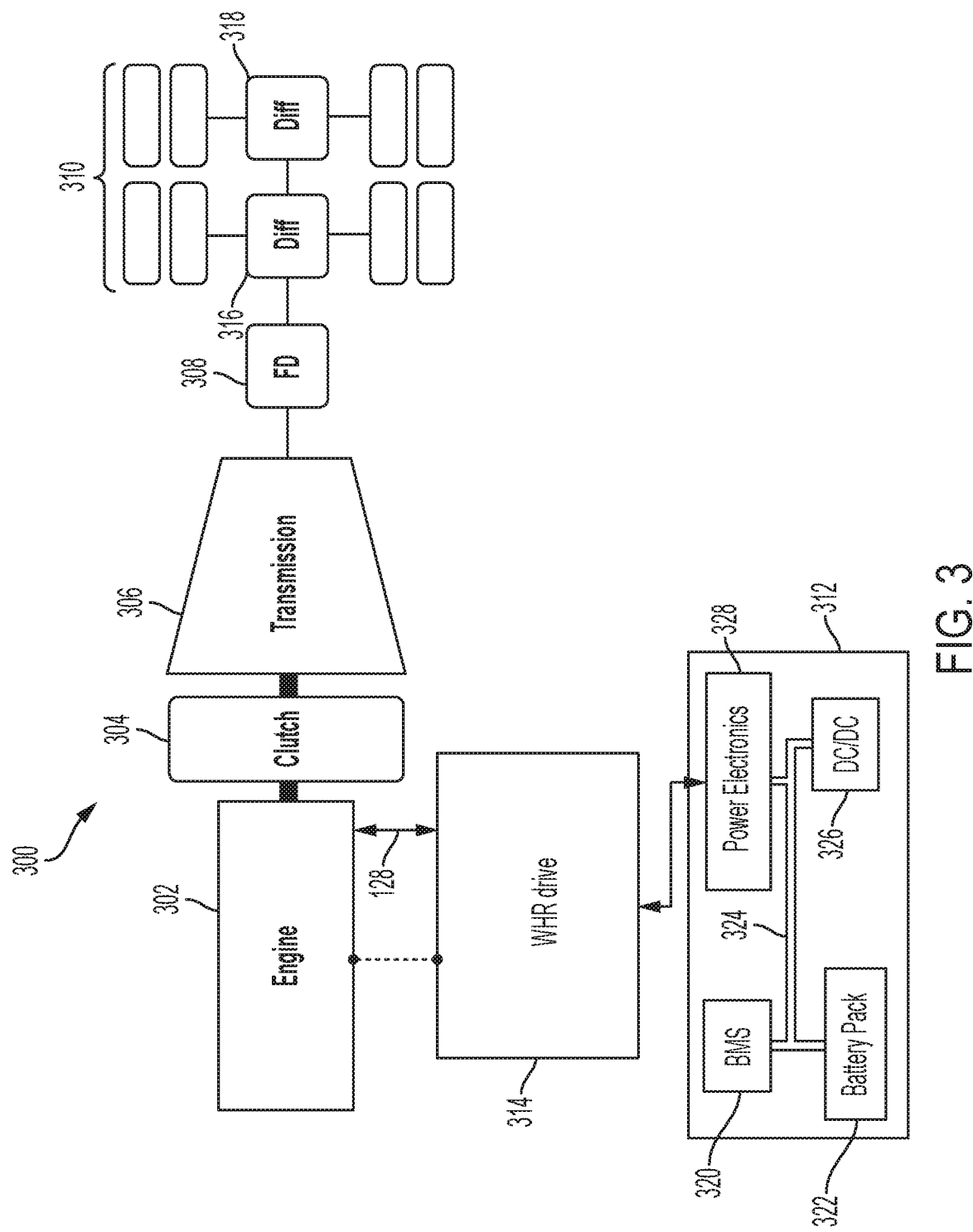
FIG. 3 shows a first example vehicle system including a WHR drive coupled to an engine, according to an embodiment of the present disclosure.

FIG. 3 shows a first example vehicle system 300 including a WHR drive coupled to an engine. The first example vehicle system 300 includes a WHR drive 314, an engine 302, a clutch 304, a transmission 306, a final drive 308, a first differential 316, a second differential 318, a set of wheels 310, and a battery system 312. The WHR drive 314 can include at least the WHR-MG drive 101, the condenser 104, the heat exchanger 122, and the controller 102 discussed above in relation to FIG. 1. The controller 102 can control one or more components of the first example vehicle system 300. The output shaft 128 shown in FIG. 3 is the shaft of the engine 302. Thus, the WHR drive 314 transfers mechanical power to and from the shaft of the engine 302. The WHR drive 314 is mounted on the engine 302, and converts the heat energy generated by the engine 302 into mechanical energy. For example, the heat exchanger 122 (FIG. 1) can exchange heat from one or more of the fluids associated with the engine 302 (e.g., coolant) with the working fluid. The mechanical energy generated by the WHR drive 314 can be provided to the shaft of the engine 302 or to the battery system 312. Alternatively, the WHR drive 314 can convert mechanical energy provided by the shaft of the engine 302 into electrical energy, which is provided to the battery system 312. The WHR drive 314 can also provide at least part of the mechanical energy to the fluid pump 126 (FIG. 1) of the WHR drive 314 to circulate the working fluid in the working fluid circuit. In another configuration, the WHR drive 314 can convert electrical energy provided by the battery system 312 into mechanical energy, which can be provided to the shaft of the engine 302.

The battery system 312 includes a battery pack 322, a battery management system (BMS) 320, power electronics 328, a DC/DC converter 326, and a bus 324. The battery pack 322 can include one or more rechargeable batteries, such as Lithium-ion, nickel-metal hydride, lead-acid, and the like. The BMS 320 can include electronics that manage the charging and discharging of the battery pack 322, the power electronics 328 can include circuitry such as circuit breakers, switches, AC/DC converters, transformers, alternators, and the like, the DC/DC converter 326 can include circuitry that can convert the voltage supplied to or provided by the battery pack 322 from one DC level to another DC level. The battery system 312 can both provide power to the WHR drive 314, such as when the motor/generator 108 (FIG. 1) is operating as a motor, and receive power to charge the battery pack 322 when the motor/generator 108 is operating as a generator.

The engine 302 can be an internal combustion engine. The internal combustion engine may include a spark-ignition engine and a compression ignition engine. Accordingly, the engine 10 may be fueled by any fuel, such as gasoline, diesel, and ethanol. In operation, the engine 10 receives a chemical energy input (e.g., a fuel such as gasoline, diesel, etc.) and combusts the fuel to generate mechanical energy, in the form of a rotating crankshaft. The transmission 306 receives the rotating crankshaft and manipulates the speed of the rotating crankshaft to provide the desired speed of rotation to the final drive 308. The transmission 306 can include a manual or automatic transmission with one or gear trains with varying ratios. The final drive 308 couples the transmission to the first and the second differential 316 and 318, which convert the rotation of the final drive 308 shaft into rotation of respective axles to turn the set of wheels 310.

Figure 4:
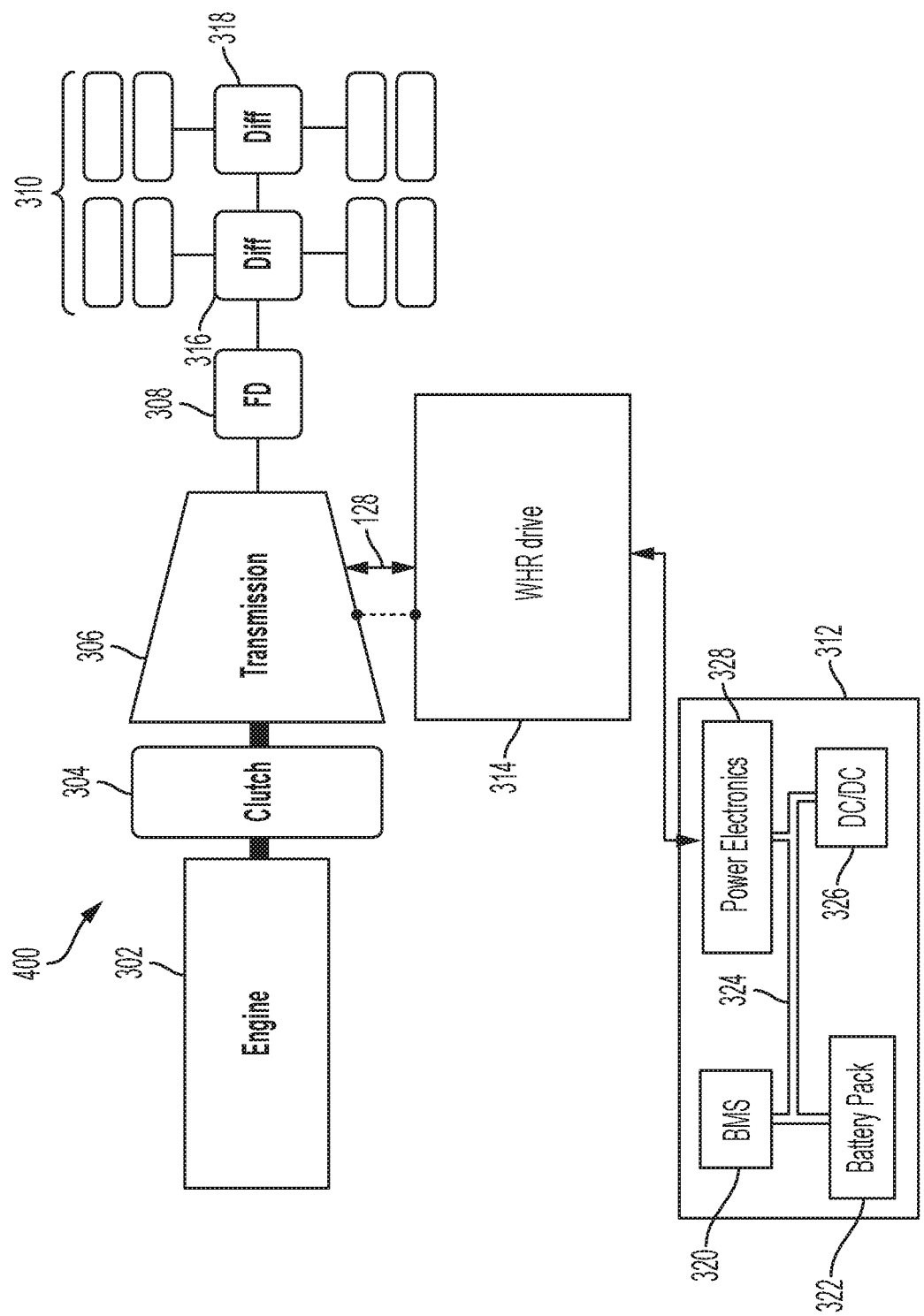
FIG. 4 shows a second example vehicle system including a WHR drive coupled to a transmission, according to an embodiment of the present disclosure.

FIG. 4 shows a second example vehicle system 400 including a WHR drive coupled to a transmission. The second example vehicle system 400 includes several components that are similar to those discussed above in relation to the first example vehicle system, and are referenced with similar reference numerals. Unlike the first example vehicle system 300, where the WHR drive 314 is coupled to the engine 302, the WHR drive 314 in the second example vehicle system 400 is instead coupled to and mounted on the transmission 306. The controller 102 can control one or more components of the second example vehicle system 400. The WHR drive 314 absorbs waste heat from the engine 302 and can also absorb heat generated by the transmission 306 and converts the absorbed heat into mechanical energy by way of the rotation of the output shaft 128. The output shaft 128, in the second example vehicle system 400 is coupled to a drive shaft of the transmission 306. The heat exchanger 122 (FIG. 1) can exchange heat from one or more of the fluids associated with the engine 302 or the transmission 306 (e.g., transmission fluid) with the working fluid. The mechanical energy generated by the WHR drive 314 can be provided to the shaft of the transmission 306 or to the battery system 312. Alternatively, the WHR drive 314 can convert mechanical energy provided by the shaft of the transmission 306 into electrical energy, which is provided to the battery system 312. The WHR drive 314 can also provide at least part of the mechanical energy to the fluid pump 126 (FIG. 1) of the WHR drive 314 to circulate the working fluid in the working fluid circuit. In another configuration, the WHR drive 314 can convert electrical energy provided by the battery system 312 into mechanical energy, which can be provided to the shaft of the transmission 306.

Figure 5:
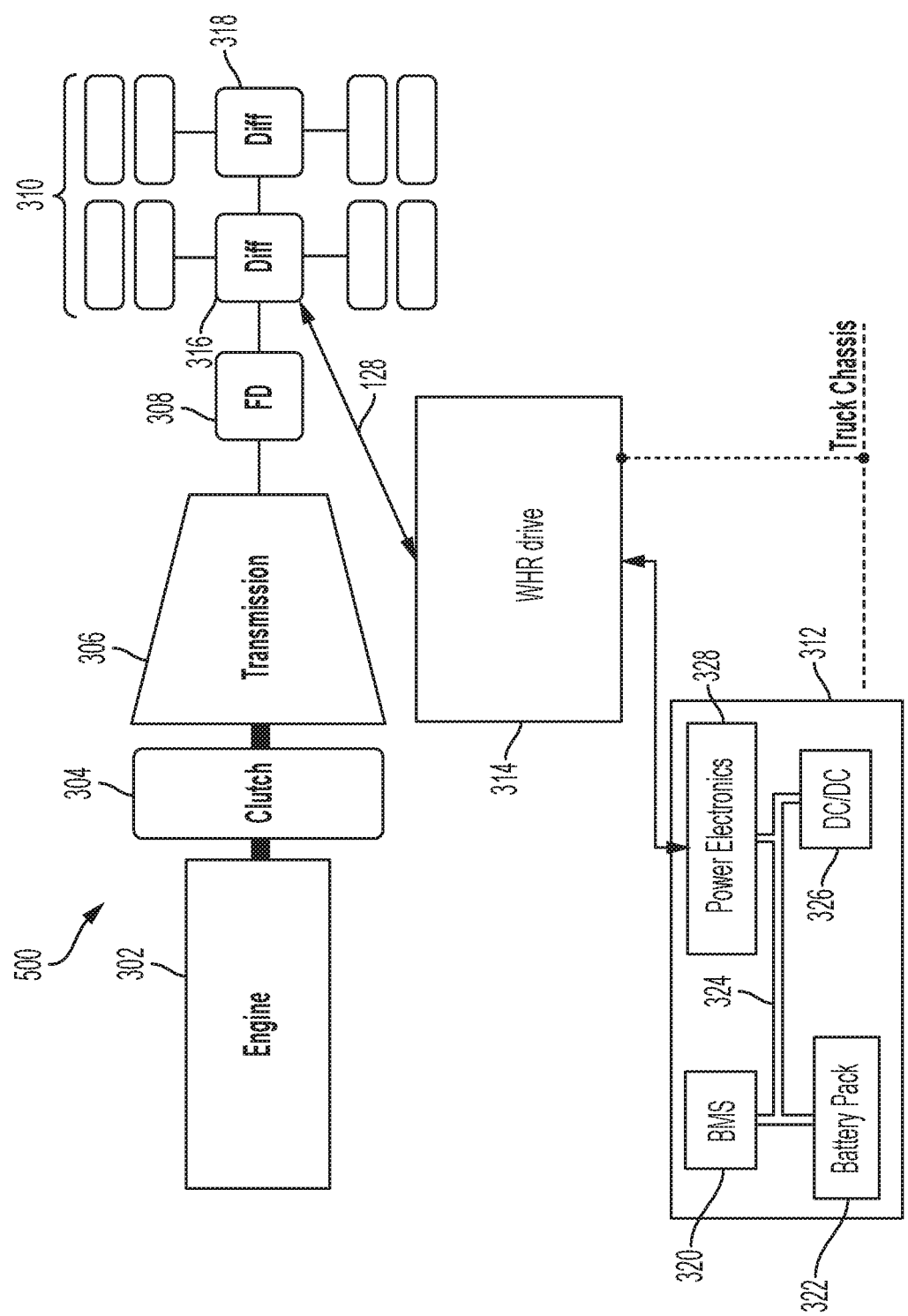
FIG. 5 shows a third example vehicle system including a WHR drive coupled to a differential, according to an embodiment of the present disclosure.

FIG. 5 shows a third example vehicle system 500 including a WHR drive coupled to a differential. The third example vehicle system 500 includes several components that are similar to those discussed above in relation to the first example vehicle system 300, and are referenced with similar reference numerals. Unlike the first example vehicle system 300, where the WHR drive 314 is coupled to the engine 302, the WHR drive 314 in the third example vehicle system 500 is instead coupled to the first differential 316. Alternatively, the WHR drive 314 may be coupled to the second differential 318 or to both the first and the second differential 316 and 318. The WHR drive 314 is mounted on a chassis (not shown) of the vehicle, but can be mounted, in part, on the first differential 316 or the second differential 318 as well. The controller 102 can control one or more components of the third example vehicle system 500. The WHR drive 314 absorbs waste heat from the engine 302 and can also absorb heat generated by the first differential 316 and converts the absorbed heat into mechanical energy by way of the rotation of the output shaft 128. The output shaft 128, in the third example vehicle system 500 is coupled to a drive shaft of the first differential 316. The heat exchanger 122 (FIG. 1) can exchange heat from one or more of the fluids associated with the engine 302 and the first differential 316 (e.g., differential fluid) with the working fluid. The mechanical energy generated by the WHR drive 314 can be provided to the shaft of the first differential 316 or to the battery system 312. Alternatively, the WHR drive 314 can convert mechanical energy provided by the shaft of the first differential 316 into electrical energy, which is provided to the battery system 312. The WHR drive 314 can also provide at least part of the mechanical energy to the fluid pump 126 (FIG. 1) of the WHR drive 314 to circulate the working fluid in the working fluid circuit. In another configuration, the WHR drive 314 can convert electrical energy provided by the battery system 312 into mechanical energy, which can be provided to the shaft of the first differential 316.

While FIGS. 4 and 5 show the output shaft 128 of the WHR drive 314 coupled to the shaft of the transmission 306 and the shaft of the first differential 316, the WHR drive 314 can be coupled to a shaft of any component of a drive train of the vehicle. The drive train may include any component that transfers power from the engine 302 to the wheels 310. As an example, the drive train can include at least the clutch 304, the transmission 306, the final drive 308, the first differential 316, and the second differential 318. Further, the WHR drive 314 can draw heat energy from one component and have the output shaft 128 be coupled to a shaft of another component of a power train of the vehicle, where the power train comprises the engine 302 and the drive train. For example, the WHR drive 314 can be mounted on the engine 302 to absorb heat energy from the engine 302, and the output shaft 128 can be coupled to the shaft of the transmission 306 or to the shaft of any other component of the drive train.

Figure 6:
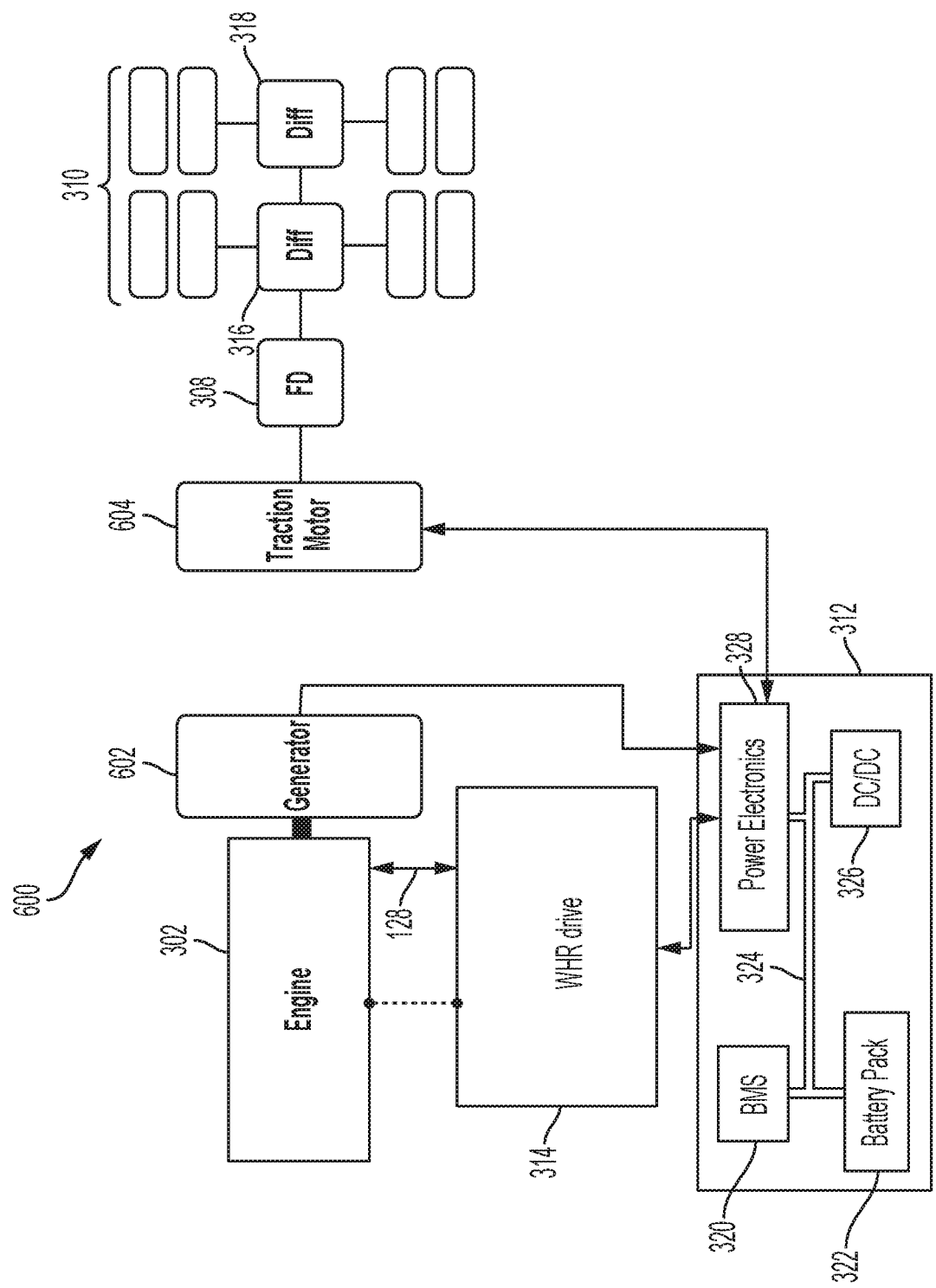
FIG. 6 shows a fourth example vehicle system including a WHR drive providing charge to a battery system of a hybrid vehicle, according to an embodiment of the present disclosure.

FIG. 6 shows a fourth example vehicle system 600 including a WHR drive providing charge to a battery system of a hybrid vehicle. The fourth example vehicle system 600 includes several components that are similar to those discussed above in relation to the first example vehicle system 300, and are referenced with similar reference numerals. Unlike the first example vehicle system 300, where the engine 302 is coupled to the final drive 308 via a transmission 306, the fourth example vehicle system 600 does not include a transmission 306 and does not mechanically couple the engine 302 to the final drive 308. Instead, in the fourth example vehicle system 600, the final drive 308 is driven by a traction motor 604, and the engine 302 is coupled to a generator 602.

The controller 102 can control one or more components of the fourth example vehicle system 600. A shaft of the generator 602 is coupled to the shaft (such as the crank shaft) of the engine 302. The generator 602 converts mechanical energy provided by the engine 302 into electrical energy, which is provided to the battery system 312. The engine 302 and the generator 602 can be used as range extenders in the fourth example vehicle system 600, which is primarily powered by the battery system 312 and the traction motor 604. For example, the controller 102 (FIG. 1) can control the engine 302 and the generator 602 to switch ON when charge on the battery pack 322 goes below a threshold value. The electrical energy generated by the generator 602 is provided to replenish the depleted charge on the battery pack 322, and thereby extend the range of operation of the vehicle. The traction motor 604 can be similar to the drive motor 150 discussed above in relation to FIG. 1. The traction motor 604 is a DC motor that receives DC power from the battery system 312 and converts the DC power into mechanical power that is provided to the final drive 308. The controller 102 controls the timing and the magnitude of the power provided by the battery system 312 to the traction motor 604, responsive to a throttle input received from the user.

The output shaft 128 shown in FIG. 6 is the shaft of the engine 302 or is coupled to the shaft of the engine 302. The WHR drive 314 transfers mechanical power to and from the shaft of the engine 302. The WHR drive 314 is mounted on the engine 302, and converts the heat energy generated by the engine 302 into mechanical energy and/or electrical energy. For example, the heat exchanger 122 (FIG. 1) can exchange heat from one or more of the fluids associated with the engine 302 (e.g., coolant) with the working fluid. The electrical energy generated by the WHR drive 314 is provided to the battery system 312 to charge the battery pack 322. The mechanical energy generated by the WHR drive 314 can be selectively provided to the shaft of the engine 302. The electrical energy generated by the WHR drive 314, and provided to the battery system 312 can further extend the range of the vehicle by providing additional charge to the battery pack 322.

Figure 7:
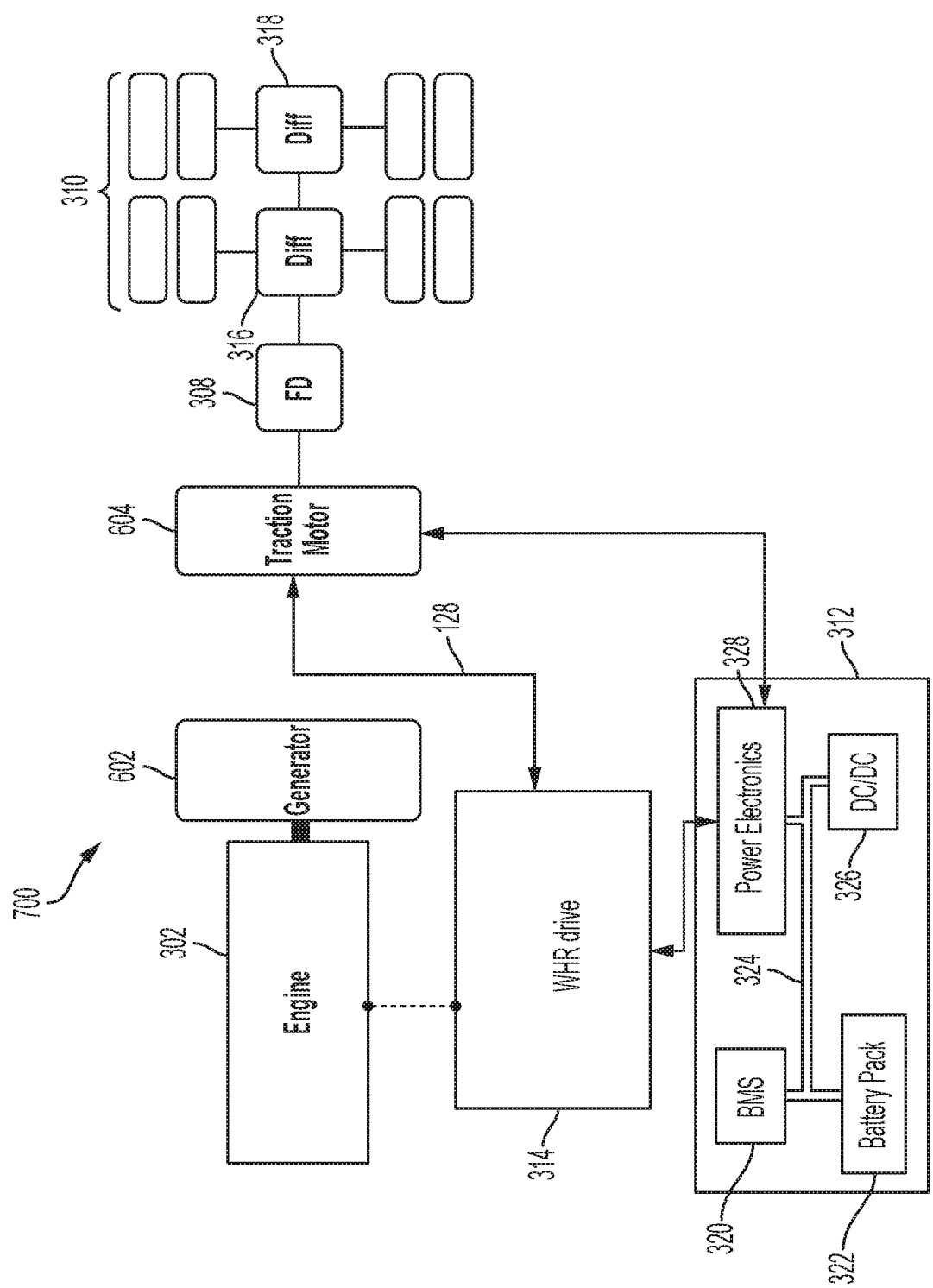
FIG. 7 shows a fifth example vehicle system including the WHR drive providing both electrical and mechanical power in a hybrid vehicle, according to an embodiment of the present disclosure.

FIG. 7 shows a fifth example vehicle system 700 including the WHR drive providing both electrical and mechanical power in a hybrid vehicle. The fifth example vehicle system 700 includes several components that are similar to those discussed above in relation to the fourth example vehicle system 600, and are referenced with similar reference numerals. Unlike the fourth example vehicle system 600 shown in FIG. 6, in which the WHR drive 314 is mechanically coupled to the engine 302, in the fifth example vehicle system 700, the WHR drive 314 is instead mechanically coupled to the traction motor 604. In particular, the output shaft 128 is the shaft of the traction motor 604 or is coupled to the shaft of the traction motor 604 such that the WHR drive 314 and the traction motor 604 can exchange mechanical power. The WHR drive 314 is mounted on the engine 302 absorbs heat generated by the engine and converts the absorbed heat into mechanical and/or electrical energy.

The controller 102 can control one or more components of the fifth example vehicle system 700. In particular, the controller 102 also can control the engine 302 and the generator 602 to switch ON when the charge level on the battery pack 322 is below a threshold. The controller 102 also can control the WHR drive 314 to selectively provide mechanical or electrical power to the traction motor 604 or the battery system 312. For example, the controller 102 can direct all the mechanical energy generated by the WHR drive 314 to the traction motor to provide additional mechanical power. The controller 102, upon detecting depletion of the charge on the battery pack 322 can control the WHR drive 314 to delink the WHR drive 314 from the traction motor 604, and direct the mechanical power into generating electric energy, which is provided to the battery system 312.

Figure 8:
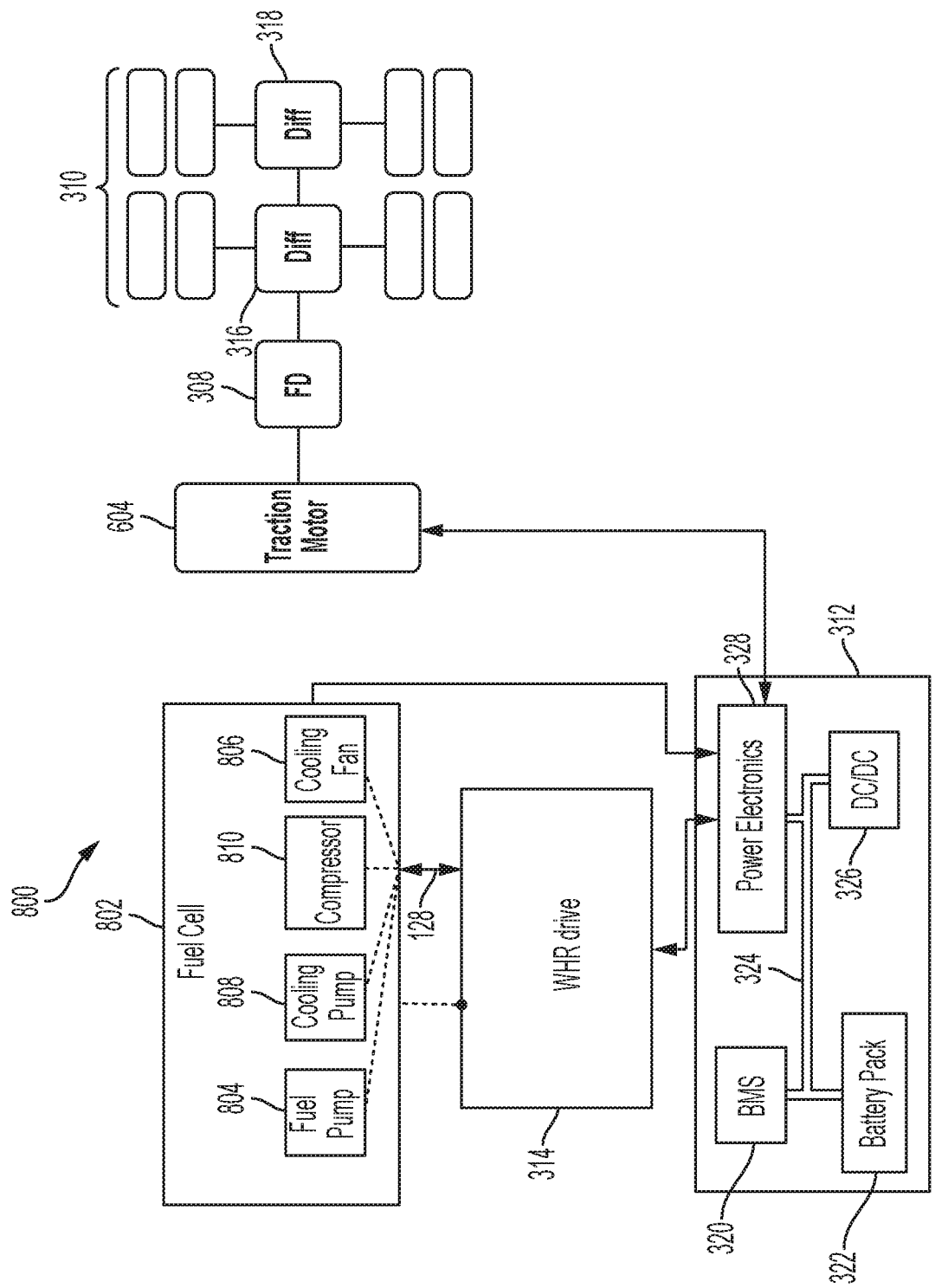
FIG. 8 shows a sixth example vehicle system including a WHR drive providing charge to a battery system of a hybrid vehicle having a fuel cell power source, according to an embodiment of the present disclosure.

FIG. 8 shows a sixth example vehicle system 800 including a WHR drive providing charge to a battery system of a hybrid vehicle having a fuel cell power source. In contrast to the vehicle system 600 shown in FIG. 6, in which the engine 302 and the generator 602 selectively provided power to the battery system 312, in the vehicle system 800 shown in FIG. 8, a fuel cell 802 can selectively provide power to the battery system 312. The fuel cell 802 can be electrically coupled to the battery system 312. In one example, the voltage and current generated by the fuel cell 802 can be provided to the battery system 312 to charge the battery pack 322 or used for DC to DC conversion by the DC/DC converter 326. In other examples, at least a portion of the electric power provided by the fuel cell 802 can be directed to the traction motor 604 by the BMS 320. Similar to the fourth example vehicle system 600 shown in FIG. 6, the sixth example vehicle system 800 includes several components that are similar to those discussed above in relation to the first example vehicle system 300, and are referenced with similar reference numerals. Also, the sixth example vehicle system 800 does not include a transmission, like the transmission 306 of the third example vehicle system 300, and instead includes the traction motor 604, which drives the final drive 308.

The fuel cell 802 converts chemically bound energy into electricity and heat by bringing a fuel into contact with an oxidizing component. The fuel cell 802 includes an anode, a cathode, and an electrolyte membrane that is interposed between the anode and the cathode. Fuel is provided to the anode, while an oxidizing gas is provided to the cathode. Fuel can include hydrogen or hydrocarbon based fuels, such as, for example, diesel, methanol, and chemical hydrides. Oxidizing gas is provided to the cathode, and can include oxygen or other oxidizing agents. The electrolyte can include substances that allow proton to pass through but block electrons, such as, for example, potassium hydroxide, salt carbonates, and phosphoric acid.

In addition to electricity, the electrochemical reaction in the fuel cell 802 generates byproducts including water and heat. Heat generated by the fuel cell 802 is provided to the WHR drive 314. The WHR drive 314 can be mounted on or in close proximity to the fuel cell 802 to allow effective heat transfer from the fuel cell 802 to the working fluid. For example, the heat exchanger 122 (FIG. 1) can be mounted on or in close proximity with the fuel cell 802 to transfer heat from the fuel cell 802 to the working fluid. The heat exchanger 122 can transfer or exchange heat from one or more of the fluids associated with the fuel cell 802.

In one example, the fuel cell 802 operates as a range extender. The controller 102 can control the fuel cell 802 to switch ON when charge on the battery pack 322 goes below a threshold value. The electrical energy generated by the fuel cell 802 is provided to replenish the depleted charge on the battery pack 322, and thereby extend the range of operation of the vehicle. The traction motor 604 can be similar to the drive motor 150 discussed above in relation to FIG. 1. The traction motor 604 is a DC motor that receives DC power from the battery system 312 and converts the DC power into mechanical power that is provided to the final drive 308. The controller 102 controls the timing and the magnitude of the power provided by the battery system 312 to the traction motor 604, responsive to a throttle input received from the user.

In one example, the output shaft 128 is coupled to at least one of a fuel pump 804, a cooling fan 806, a cooling pump 808, or a compressor 810 of the fuel cell 802. For example, the fuel cell 802 can include a fuel pump 804 that pumps fuel into the fuel cell or a pump that pumps oxygen or the oxidizing agent to the fuel cell. The output shaft 128 is coupled to a shaft of the fuel pump 804. This coupling allows the WHR drive 314 to transfer mechanical power to and from the shaft of the fuel pump 804. The cooling pump 808 can pump cooling fluid through the fuel cell 802 to control the temperature of the fuel cell 802. The cooling fan 806 can also aid in controlling the temperature of the fuel cell 802. One or more compressors 810 can be used to compress the fuel or the oxidizing gas and provide the fuel and the oxidizing gas to the fuel cell 802. The output shaft 128 can be coupled to the shafts of at least one of the fuel pump 804, the cooling fan 806, the cooling pump 808, or the compressor 810 of the fuel cell 802 to allow transfer of mechanical power to and from the WHR drive 314.

Figure 9:
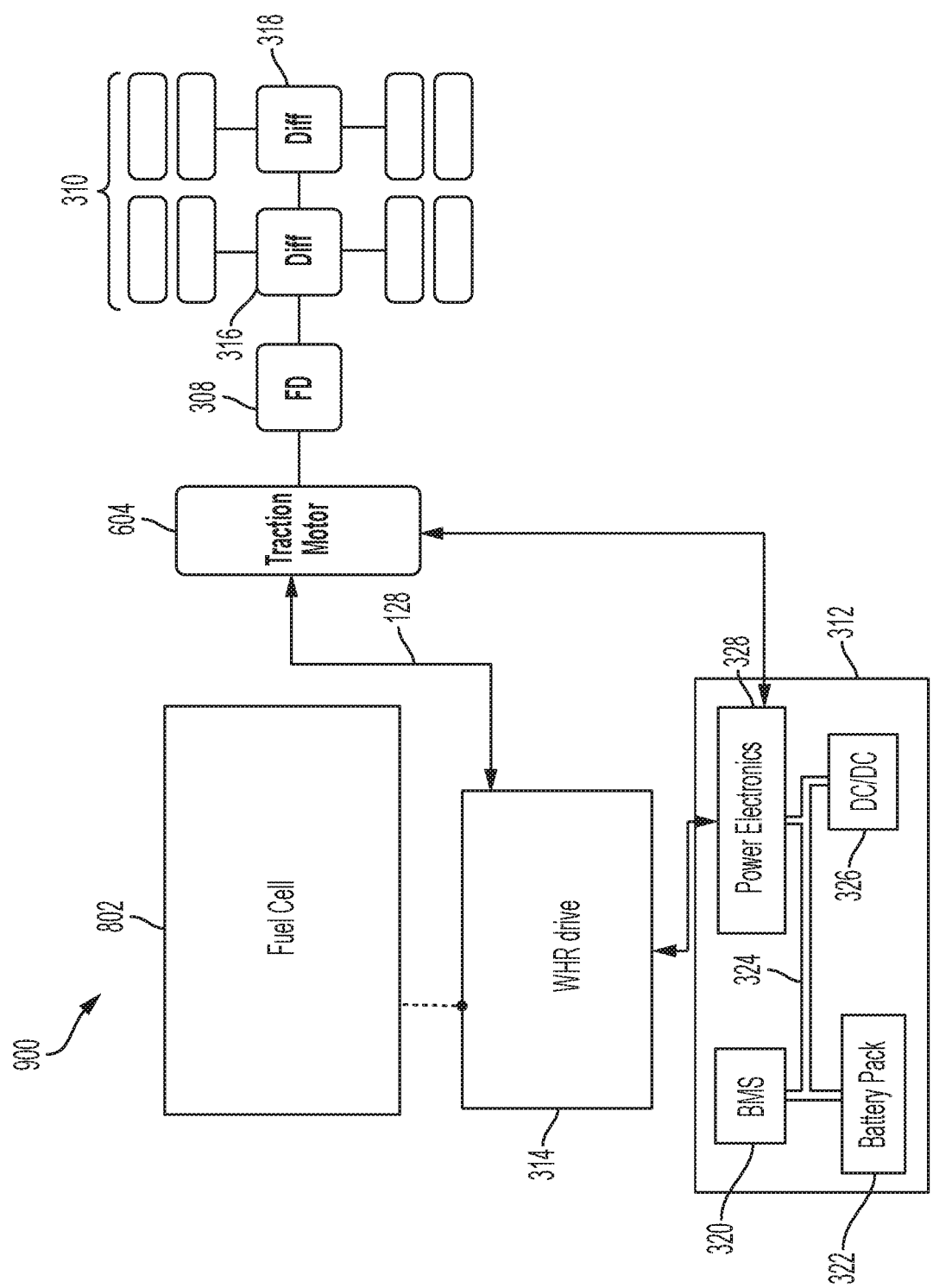
FIG. 9 shows a seventh example vehicle system including the WHR drive providing both electrical and mechanical power in a hybrid vehicle having a fuel cell, according to an embodiment of the present disclosure.

FIG. 9 shows a seventh example vehicle system 900 including the WHR drive providing both electrical and mechanical power in a hybrid vehicle having a fuel cell. The seventh example vehicle system 900 includes several components that are similar to those discussed above in relation to the sixth example vehicle system 800, and are referenced with similar reference numerals. Unlike the sixth example vehicle system 800, in which the WHR drive 314 was not mechanically coupled with the traction motor 604, in the seventh example vehicle system 900, the WHR drive 314 can be mechanically coupled to the traction motor 604. In particular, the shaft 128 is the shaft of the traction motor 604 or is coupled to the shaft of the traction motor 604 such that the WHR drive 314 and the traction motor 604 can exchange mechanical power. In one example, the WHR drive 314 mounted on the fuel cell 802 absorbs heat generated by the fuel cell 802 and converts the absorbed heat energy into mechanical and/or electrical energy.

The controller 102 can control one or more components of the seventh example vehicle system 900. In particular, the controller 102 also can control the fuel cell 802 to switch ON when the charge level on the battery pack 322 is below a threshold value. The controller 102 can also control the WHR drive 314 to selectively provide mechanical or electrical power to the traction motor 604 or the battery system 312. For example, the controller 102 can direct all the mechanical energy generated by the WHR drive 314 to the traction motor 604 to provide additional mechanical power. The controller 102, upon detecting depletion of the charge on the battery pack 322 can control the WHR drive 314 to delink the WHR drive 314 from the traction motor 604, and direct the mechanical power into generating electric energy, which is provided to the battery system 312.

While the example vehicle systems discussed above in relation to FIGS. 7 and 9 show the output shaft 128 coupled to the traction motor 604, in some examples, the output shaft can be coupled to a shaft of other components of the drive train, for example, the final drive 308, the first differential 316, or the second differential 318.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A vehicle system, comprising:
   an engine;
   a transmission coupled to the engine;
   a differential coupled to the transmission; and
   a waste heat recovery (WHR) hybrid power drive system, comprising:
   a WHR power unit structured to convert thermal energy into rotation of a WHR drive shaft,
   a motor/generator structured to selectively operate as a motor or a generator, the motor/generator having a motor/generator drive shaft, and
   a mechanical linkage coupled to the WHR drive shaft, the motor generator drive shaft, and an output shaft, structured to selectively link the output shaft to one of the WHR drive shaft and the motor/generator drive shaft independently of the other of the WHR drive shaft and the motor/generator drive shaft;
   wherein the output shaft is coupled to at least one of a shaft of the engine, a shaft of the transmission, or a shaft of the differential.

2. The system of claim 1, wherein the output shaft is coupled to the shaft of the engine, wherein the WHR drive is mounted on the engine, and wherein the WHR power unit is structured to convert thermal energy generated by the engine into the rotation of the WHR drive shaft.

3. The system of claim 1, wherein the output shaft is coupled to the shaft of the transmission, wherein the WHR drive is mounted on the transmission, and wherein the WHR power unit is structured to convert thermal energy generated by the engine or the transmission into the rotation of the WHR drive shaft.

4. The system of claim 1, wherein the output shaft is coupled to the shaft of the differential, wherein the WHR drive is mounted on a chassis of the vehicle, and wherein the WHR power unit is structured to convert thermal energy generated by the engine or the transmission into the rotation of the WHR drive shaft.

5. A vehicle system, comprising:
   a power generator;
   a waste heat recovery (WHR) hybrid power drive system, comprising:
   a WHR power unit structured to convert thermal energy generated by the vehicle system into rotation of a WHR drive shaft;
   a motor/generator structured to selectively operate as a motor or a generator, the motor/generator having a motor/generator drive shaft; and
   a mechanical linkage coupled with the WHR drive shaft, the motor/generator and an output shaft, structured to selectively link the output shaft to one of the WHR drive shaft and the motor/generator drive shaft independently of the other of the WHR drive shaft and the motor/generator drive shaft,
   wherein the output shaft is directly or indirectly coupled to a shaft of the power generator or to a drive shaft of a drive train of the vehicle system.

6. The vehicle system of claim 5, the WHR hybrid power drive system further comprising:
   a first decoupling device positioned between the WHR drive shaft and the mechanical linkage, the first decoupling device allowing the WHR drive shaft to rotate at a speed that is different from a speed of rotation of at least one of the output shaft or the motor/generator drive shaft.

7. The vehicle system of claim 5, the WHR hybrid power drive system further comprising:
   a decoupling device positioned between the output shaft and the mechanical linkage, the decoupling device allowing the output shaft to rotate at a speed that is different from a speed of rotation of at least one of the WHR drive shaft or the motor/generator drive shaft.

8. The vehicle system of claim 5, the WHR hybrid power drive system further comprising:
   a decoupling device positioned between the motor/generator drive shaft and the mechanical linkage, the decoupling device allowing the motor/generator drive shaft to rotate at a speed that is different from a speed of rotation of at least one of the output shaft or the WHR drive shaft.

9. The vehicle system of claim 5, the WHR hybrid power drive system further comprising:
a feed pump coupled to the WHR drive shaft, the feed pump configured to pump a working fluid in a working fluid circuit of the WHR hybrid power drive.

10. The vehicle system of claim 5, wherein the mechanical linkage is structured to simultaneously and proportionally transfer power from the WHR drive shaft to the output shaft and the motor/generator drive shaft.

11. The vehicle system of claim 5, wherein the mechanical linkage is structured to simultaneously and proportionally transfer power from the output shaft to the WHR drive shaft and the motor/generator drive shaft.

12. The vehicle system of claim 5, wherein the mechanical linkage is controlled to transfer power from the WHR drive shaft to the motor/generator drive shaft in response to the vehicle system not being in motion.

13. The vehicle system of claim 5, wherein the power generator comprises an engine, the output shaft is coupled to a shaft of the engine, the WHR power unit is mounted on the engine, and the WHR power unit is structured to convert thermal energy generated by the engine into the rotation of the WHR drive shaft.

14. The vehicle system of claim 5, wherein the drive train comprises a transmission, the output shaft is coupled to a shaft of the transmission, the WHR power unit is mounted on the transmission, and the WHR power unit is structured to convert thermal energy generated by the transmission into the rotation of the WHR drive shaft.

15. The vehicle system of claim 5, wherein the drive train comprises a differential, the output shaft is coupled to a shaft of the differential, the WHR power unit is mounted on the differential, and the WHR power unit is structured to convert thermal energy generated by the differential into the rotation of the WHR drive shaft.

16. The vehicle system of claim 5, wherein the power generator comprises an engine and a generator structured to generate and provide electrical energy to a battery system, the vehicle system further comprising a traction motor mechanically coupled to a final drive of the vehicle system and electrically coupled to the battery system, wherein the output shaft is coupled to a shaft of the engine or a shaft of the generator.

17. The vehicle system of claim 5, wherein the power generator comprises an engine and a generator structured to generate and provide electrical energy to a battery system, the vehicle system further comprising a traction motor mechanically coupled to a final drive of the vehicle system and electrically coupled to the battery system, wherein the output shaft is coupled to a shaft of the traction motor.

18. The vehicle system of claim 5, wherein the power generator comprises a fuel cell structured to generate and provide electrical energy to a battery system, the vehicle system further comprising a traction motor mechanically coupled to a final drive of the vehicle system and electrically coupled to the battery system, wherein the output shaft is coupled to a shaft of at least one of a fuel pump, a cooling fan, a cooling pump, or a compressor of the fuel cell.

19. The vehicle system of claim 5, wherein the power generator comprises a fuel cell structured to generate and provide electrical energy to a battery system, the vehicle system further comprising a traction motor mechanically coupled to a final drive of the vehicle system and electrically coupled to the battery system, wherein the output shaft is coupled to a shaft of the traction motor.

20. A method for operating a vehicle system comprising a power generator and a drive train, the method comprising:
providing a waste heat recovery (WHR) hybrid power drive system comprising a WHR power unit structured to convert thermal energy generated by the vehicle system into rotation of a WHR drive shaft, a motor/generator structured to selectively operate as a motor or a generator, the motor/generator having a motor/generator drive shaft, and a mechanical linkage coupled with the WHR drive shaft, the motor/generator and an output shaft, controlling the mechanical linkage to link and transfer power between the output shaft and the WHR drive shaft;
controlling the mechanical linkage to delink the output shaft from the WHR drive shaft; and
controlling the mechanical linkage to link and transfer power between the output shaft and the motor/generator drive shaft,
wherein the output shaft is directly or indirectly coupled to a shaft of the power generator or to a drive shaft of a drive train of the vehicle system.

21. The method of claim 20, further comprising:
while the output shaft is linked with the WHR drive shaft, controlling a first decoupling device positioned between the WHR drive shaft and the mechanical linkage or a second decoupling device positioned between the output shaft and the mechanical linkage to rotate the WHR drive shaft at a speed that is different from a speed of rotation of the output shaft.

22. The method of claim 20, further comprising:
while the output shaft is linked with the motor/generator drive shaft, controlling a second decoupling device positioned between output shaft and the mechanical linkage or a third decoupling device positioned between the motor/generator drive shaft and the mechanical linkage to rotate the motor/generator drive shaft at a speed that is different from a speed of rotation of the output shaft.

23. The method of claim 20, further comprising:
transferring power from the WHR drive shaft to a feed pump coupled to the WHR drive shaft, the feed pump configured to pump a working fluid in a working fluid circuit of the WHR hybrid power drive system.

24. The method of claim 20, further comprising:
controlling the mechanical linkage to delink the output shaft from the motor/generator drive shaft; and
controlling the mechanical linkage to link and transfer power between the WHR drive shaft and the motor/generator drive shaft.

* * * * *